United States Patent [19]
del Castillo

[11] 3,886,839
[45] June 3, 1975

[54] OPTICAL METRONOME
[76] Inventor: Juan M. del Castillo, Risco 119, Mexico City, Mexico
[22] Filed: Mar. 1, 1972
[21] Appl. No.: 230,701

[52] U.S. Cl. .................................................. 84/484
[51] Int. Cl. ............................................. G10b 15/00
[58] Field of Search ................................... 84/424

[56] References Cited
UNITED STATES PATENTS
| | | | |
|---|---|---|---|
| 445,119 | 1/1891 | Lawshe | 84/484 |
| 1,571,110 | 1/1926 | Ebert et al. | 84/484 |
| 1,664,010 | 3/1928 | Welch | 84/484 |

Primary Examiner—Lawrence R. Franklin
Attorney, Agent, or Firm—Karl W. Flocks

[57] ABSTRACT

A wide web is mounted on a pair of moving rollers with the web made of a transparent material being at least the width of the music sheet and having at least two vertical lines drawn the width of the web so as to pass these lines in front of the sheet of music in a timed relationship according to the speed at which the notes are to be played.

2 Claims, 4 Drawing Figures

PATENTED JUN 3 1975
3,886,839
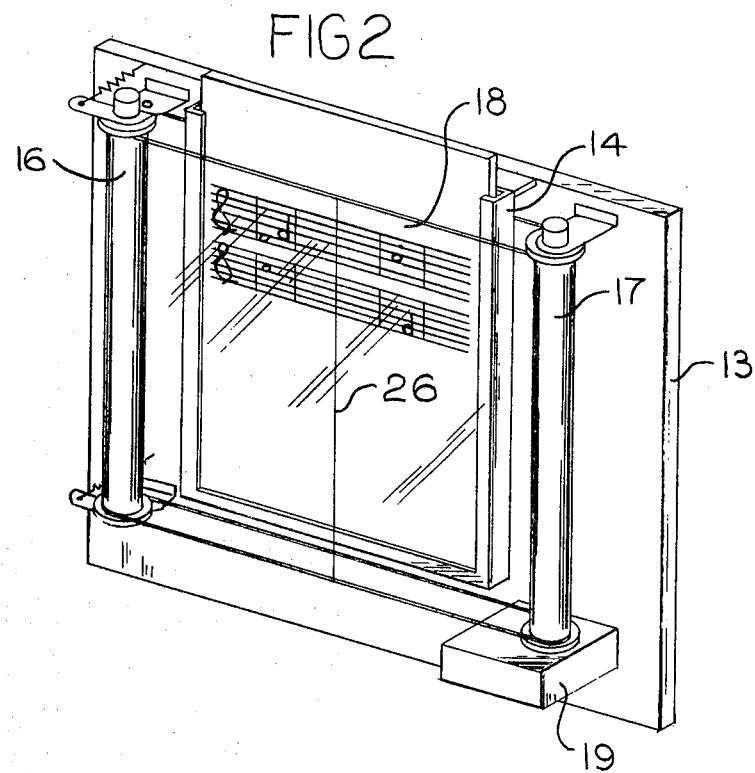
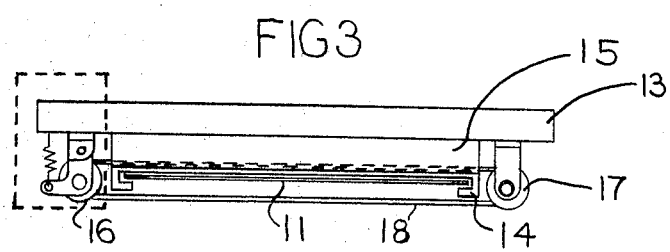
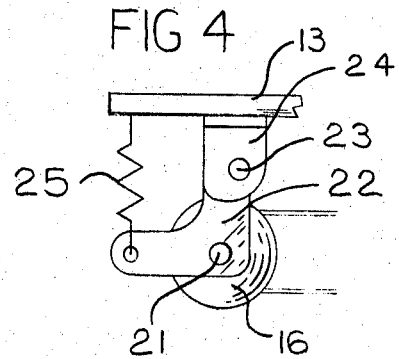
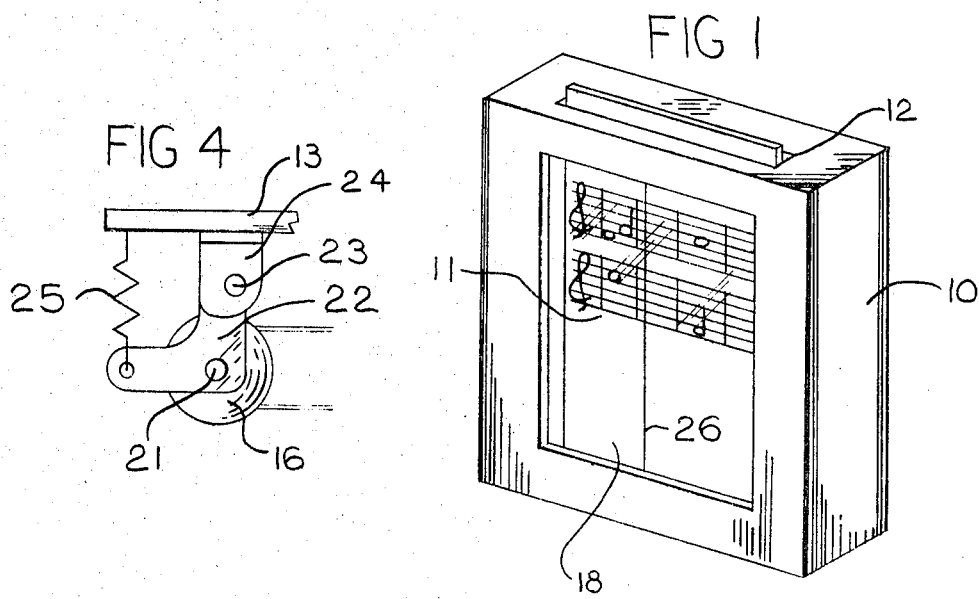

OPTICAL METRONOME

BACKGROUND OF THE INVENTION

The present invention relates to a device for aiding the teaching of the time of duration in study of music.

It is an object of the present invention to provide a teaching device which will impart timing and rhythm to the student in the study of music by indicating the timing when each note is to be played.

It is also an object of the present invention to allow the student to view the whole music sheet without impediment to the view of any of the notes thereon, with the same view that he will have after he no longer has need for the present device.

It is a further object of the present invention to allow the teaching device to be a very simple and comparatively inexpensive device.

The present invention relates to an optical form of metronome having a casing within which are mounted a pair of rollers, one a driving roller and the other an idler roller, having a continuous transparent web passing therebetween, and a holder for sheet music depending within the web run in view behind the outer transparent web run, with at least two vertical lines on said transparent web and transverse thereto.

BRIEF DESCRIPTION OF THE DRAWING

FIG. 1 is the optical metronome of the present invention in a casing;

FIG. 2 is an enlarged view of the device of FIG. 1 with the case removed;

FIG. 3 is a top plan view of the device as shown in FIG. 2;

FIG. 4 is an enlarged view of the portion shown in a dashed rectangle in FIG. 3.

DESCRIPTION OF THE PREFERRED EMBODIMENT

Referring first to FIG. 1, there is shown the device of the present invention encased in case 10 with music sheet 11 which can be inserted through slot 12 positioned so as to be viewed through the open front of case 10.

An enlarged view with case 10 removed is shown in FIG. 2. On supporting backboard 13 there is mounted a music sheet holder 14 spaced from backboard support 13 by a bracket or extending shelf 15. On each side of music sheet holder 14 are mounted rollers 16 and 17 mounted by means of brackets to backboard support 13. A transparent continuous web 18 having a width approximately that of the music sheet 11 passes over rollers 16 and 17 and is moved by them. Roller 17 is driven by a motor contained in box 19 and connected to roller 17 by appropriate gearing. Motor in box 19 has controls (not shown) which may be used to operate it at different speeds in accordance with the timing required for the particular sheet of music. Such a control with the motor could be a rheostat or alternatively a multiple geared and clutching arrangement.

In order to maintain transparent web 18 under tension the arrangement shown in enlarged view in FIG. 4 is used on both ends of roller 16. Roller 16 turns in bearings 21 held in brackets 22 which in turn pivot at points 23 on brackets 24 which in turn are attached to backboard support 13. Springs 25 attached to brackets 22 at the opposite end from their connection and pivot points 23 maintain the proper tension on web 18.

A vertical line 26 on transparent web 18 as shown in FIGS. 1 and 2 moves across music sheet 11 in timed relation to the music being played, with the timing determined by the motor in box 19 and its attachment to roller 17. A second vertical line 26 also drawn transversely of web 18 is at the same time passing behind music sheet holder 14 and is placed on web 18 so as to be positioned at the beginning of the line of music just as the first vertical line has reached the end of a line of music. Depending upon the size of the device and of web 18 there may be more than two vertical lines to accomplish this placement of vertical lines at beginning and ends of lines of music.

Although now shown as part of the invention, the casing may be so arranged that the sheet of music protrudes above slot 12 so that it may be easily removed when finished or alternatively an opening means could be made at the bottom of holder 14 to allow the release therethrough but this would require a different mounting than merely fitting the device on a piano.

It will be obvious to those skilled in the art that various changes may be made without departing from the scope of the invention and the invention is not to be considered limited to what is shown in the drawing and described in the specification.

What is claimed is:

1. An optical metronome comprising
   means to hold a sheet of music,
   a pair of spaced rollers with one of said rollers mounted on each side of said holding means,
   a continuous transparent web passing around and between said rollers and in front of said holding means,
   at least two vertical lines drawn on said transsparent web transversely of said web,
   means to move said rollers to move said vertical lines past said holding means in timed relation to the music on a sheet held in said holding means, and
   a casing enclosing the metronome having a slot positioned over said holding means to receive a sheet of music.

2. The metronome of claim 1, further characterized by
   said slot being located within and between the projections of vertical planes passing through the sides of said spaced rollers which are closest to each other,
   tension means connected to the other of said rollers than the one connected to said means to move said rollers,
   said tension means including
   pivotal means supporting said other of said rollers,
   and spring means connected to the other end of said pivotal means from the end at which it pivots whereby said web is maintained under proper tension for operation,
   said tension means being outside of said projections of said vertical planes.

* * * * *